(12) United States Patent
Ouyang et al.

(10) Patent No.: US 11,722,778 B2
(45) Date of Patent: Aug. 8, 2023

(54) UNDERWATER IMAGING SYSTEM

(71) Applicant: FLORIDA ATLANTIC UNIVERSITY BOARD OF TRUSTEES, Boca Raton, FL (US)

(72) Inventors: Bing Ouyang, Vero Beach, FL (US); Fraser Dalgleish, Vero Beach, FL (US); Frank Caimi, Vero Beach, FL (US); Anni Dalgleish, Vero Beach, FL (US)

(73) Assignee: Florida Atlantic University Board of Trustees, Boca Raton, FL (US)

( * ) Notice: Subject to any disclaimer, the term of this patent is extended or adjusted under 35 U.S.C. 154(b) by 0 days.

(21) Appl. No.: 17/283,862

(22) PCT Filed: Aug. 8, 2019

(86) PCT No.: PCT/US2019/045701
§ 371 (c)(1),
(2) Date: Apr. 8, 2021

(87) PCT Pub. No.: WO2020/101772
PCT Pub. Date: May 22, 2020

(65) Prior Publication Data
US 2021/0352201 A1    Nov. 11, 2021

Related U.S. Application Data

(60) Provisional application No. 62/742,620, filed on Oct. 8, 2018.

(51) Int. Cl.
*H04N 23/74* (2023.01)
*G06T 5/00* (2006.01)
(Continued)

(52) U.S. Cl.
CPC ............. *H04N 23/74* (2023.01); *G06T 5/002* (2013.01); *G06T 5/20* (2013.01); *G06T 5/50* (2013.01); *G06T 2207/10152* (2013.01)

(58) Field of Classification Search
CPC ...... H04N 5/2354; H04N 23/74; G06T 5/002; G06T 5/20; G06T 5/50;
(Continued)

(56) References Cited

U.S. PATENT DOCUMENTS

2012/0069342 A1 * 3/2012 Dalgleish .............. G01N 21/47
356/445
2014/0267623 A1    9/2014 Bridges et al.
(Continued)

FOREIGN PATENT DOCUMENTS

CA    2750339 A1 * 7/2010 ............ A61K 31/18
CA    2516070 C * 5/2012 ........... G01S 17/023
(Continued)

OTHER PUBLICATIONS

Bing Ouyang et al., ; "Experimental Study of Underwater Stereo via Pattern Projection"; Florida Atlantic University of Miami, © 2012 IEEE (Year: 2012).*

(Continued)

*Primary Examiner* — Dramos Kalapodas
(74) *Attorney, Agent, or Firm* — Meunier Carlin & Curfman LLC

(57) ABSTRACT

A method and apparatus provides for improved imaging of objects underwater. The method and apparatus are particularly useful in a degraded underwater visual environment. The method and apparatus are also useful in undersea operations in which enhanced visualization at close range is desirable. Exemplary operations include diver assist, ship hull inspections, underwater robotic operations (e.g. sample collection, mine neutralization), etc.

8 Claims, 10 Drawing Sheets

(51) Int. Cl.
*G06T 5/20* (2006.01)
*G06T 5/50* (2006.01)

(58) Field of Classification Search
CPC ...... G06T 2207/10152; G02B 26/0833; G02B 27/0961; G01B 11/25; G03B 15/06; G03B 17/08
See application file for complete search history.

(56) References Cited

U.S. PATENT DOCUMENTS

| | | | |
|---|---|---|---|
| 2017/0118423 A1* | 4/2017 | Zhou | H04N 23/74 |
| 2017/0299722 A1 | 10/2017 | Ouyang et al. | |
| 2019/0090791 A1* | 3/2019 | Siu | A61B 5/14507 |
| 2021/0016496 A1* | 1/2021 | Chen | B29C 64/129 |
| 2021/0191278 A1* | 6/2021 | Tel | G03F 7/70625 |

FOREIGN PATENT DOCUMENTS

| | | | | |
|---|---|---|---|---|
| CN | 101416407 A | * | 4/2009 | H04B 1/69 |
| CN | 207869220 U | * | 9/2018 | H04N 5/2252 |
| CN | 207923720 U | * | 9/2018 | |

OTHER PUBLICATIONS

International Search Report for corresponding PCT Application No. PCT/US2019/045701 dated Apr. 30, 2020.
Dabov et al., "Image Denoising by Sparse 3-D Transform-Domain Collaborative Filtering", IEEE Transactions of Image Processing, vol. 6, No. 8, pp. 2080-2095 (2007).
Genin et al., "Background First-and Second-Order Modeling for Point Target Detection", Applied Optics, vol. 51, No. 31, pp. 7701-7713 (2012).
Ouyang et al., "Experimental Study of Underwater Stereo via Pattern Projection", Oceans, pp. 1-7 (2012).
Rudin et al., "Nonlinear Total-Variation-Based Noise Removal Algorithms," Physica D: Nonlinear Phenomena, vol. 60, Issues 1-4, pp. 259-268 (1992).
Boston Engineering Corporation, "Active Imaging Systems for EOD", 2014.

* cited by examiner

| Target distance (meter) | | 4.3 |
|---|---|---|
| Cumulative AZ Dust (g) | C @ 532 nm m^-1 | Beam Attn. Lengths (C*distance) |
| 0 | 0.07 | 0.301 |
| 184 | 0.664 | 2.8552 |
| 280 | 0.937 | 4.0291 |
| 344 | 1.119 | 4.8117 |
FIG. 7
FIG. 8A
FIG. 8B

UNDERWATER IMAGING SYSTEM

CROSS-REFERENCE TO RELATED APPLICATIONS

This application is a U.S. National Phase Application of PCT/US2019/045701, filed Aug. 8, 2019, which claims priority to Application Ser. No. 62/742,620 filed on Oct. 8, 2018 entitled UNDERWATER IMAGING SYSTEM, the contents of which applications are incorporated herein by reference in their entireties for all purposes.

STATEMENT REGARDING FEDERALLY SPONSORED RESEARCH OR DEVELOPMENT

This invention(s) was made with government support under contract number N0025317C0028 awarded by the Naval Undersea Warfare Center. The government has certain rights in the invention(s).

FIELD OF DISCLOSURE

This disclosure relates generally to systems and methods for underwater imaging, and more particularly, to imaging of objects underwater in an underwater visual environment where enhanced visualization is desirable.

BACKGROUND

In turbid or turbulent mediums, such as underwater environments, an illumination pattern may be degraded when propagating from an illuminator to a target. Degradation can be caused by multiple factors. Exemplary factors include contrast loss from common volumes scattering, blurring such as from forward scattering/beam wandering, and exponential attenuation of target returns.

SUMMARY

The following presents a simplified summary in order to provide a basic understanding of some aspects of one or more embodiments or examples of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later. Additional goals and advantages will become more evident in the description of the figures, the detailed description of the disclosure, and the claims.

The foregoing and/or other aspects and utilities embodied in the present disclosure may be achieved by providing a system and method for imaging underwater objects, including generating spatially varying modulation on a beam of light using a spatial light modulator, illuminating a target with the beam of light having spatially varying modulation, capturing an image of said target illuminated with said light having said spatially varying modulation using a dynamic range detector, and post processing the captured image.

According to aspects described herein, an apparatus for imaging underwater objects includes a spatial light modulator, a light source, and a dynamic range detector. The spatial light modulator generates spatially varying modulation on a beam of light. Thea light source illuminates a target with the modulated beam of light having spatially varying modulation to produce a sequence of coded illumination patterns projected on the target. The dynamic range detector captures a plurality of images of the target illuminated with the modulated beam of light having the sequence of coded illumination patterns. The apparatus may also include a controller configured to receive digital modulation pattern data and modify the spatial light modulator to modulate the beam of light in accordance with the received digital modulation pattern data, and a computer providing post processing of the captured images.

According to aspects illustrated herein, a method for imaging underwater objects includes emitting a beam of light from a light source, generating spatially varying modulation on the beam of light using a spatial light modulator, modifying the spatial light modulator with a controller to modulate the beam of light in accordance with received digital modulation pattern data, illuminating a target with the modulated beam of light having spatially varying modulation to produce a sequence of coded illumination patterns, capturing a plurality of images of the target illuminated with the modulated beam of light having the sequence of coded illumination patterns, with at least two of the plurality of images corresponding to different ones of the coded illumination patterns using a dynamic range detector, and post processing the captured images.

Exemplary embodiments are described herein. It is envisioned, however, that any system that incorporates features of apparatus and systems described herein are encompassed by the scope and spirit of the exemplary embodiments.

BRIEF DESCRIPTION OF THE DRAWINGS

Various exemplary embodiments of the disclosed apparatuses, mechanisms and methods will be described, in detail, with reference to the following drawings, in which like referenced numerals designate similar or identical elements, and:

FIG. 7 is a table showing cumulative AZ dust, C and beam attenuation lengths for images taken of underwater target at a distance of 4.3 meters;

FIG. 8A is an image of underwater target taken with a Thorlabs DCC3626 camera and floor illumination;

FIG. 8B is an image of underwater target taken with a Nikon camera and flood illumination;

DETAILED DESCRIPTION

Figure 1:
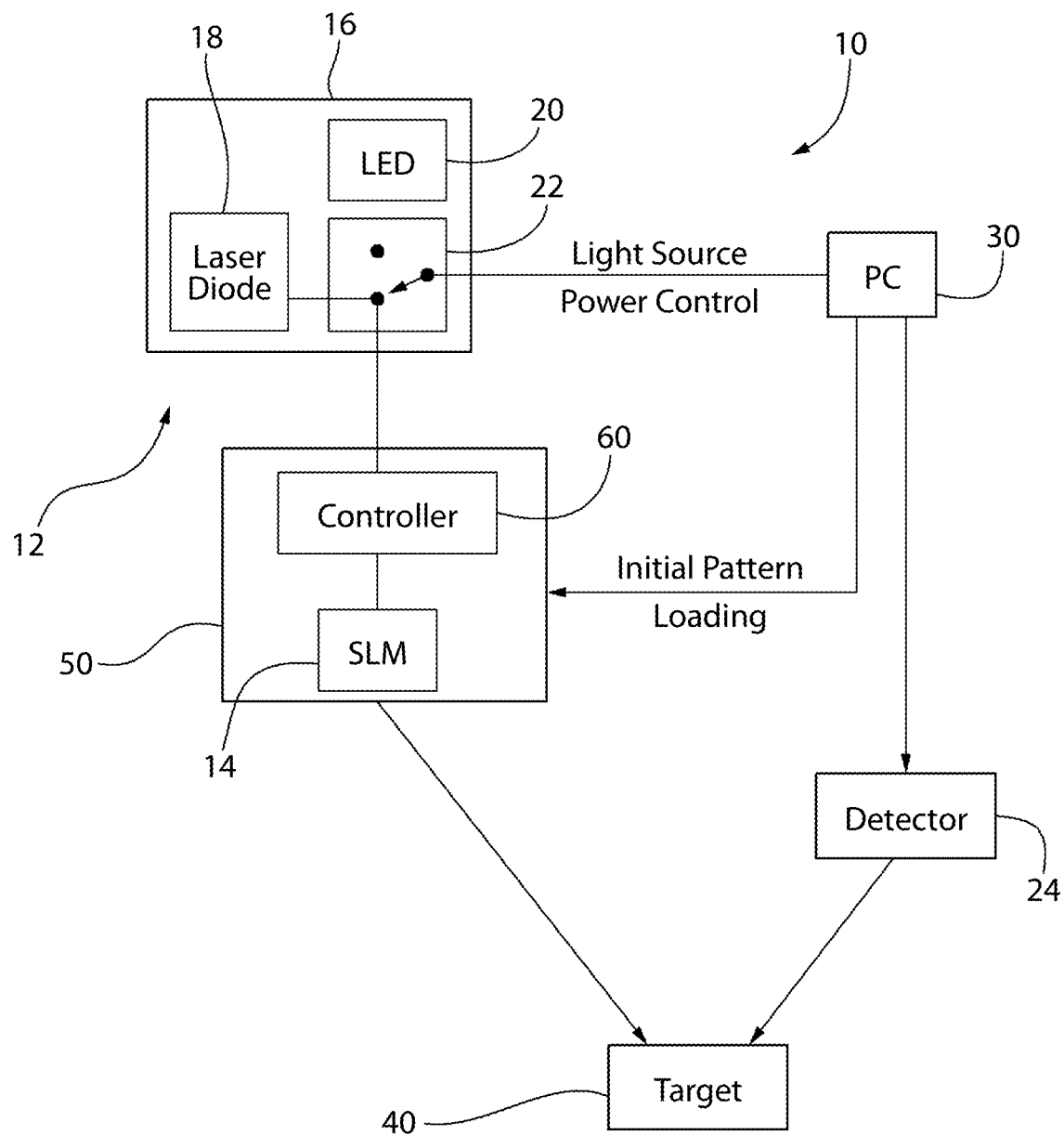
FIG. 1 a block diagram of an apparatus for imaging objects underwater in accordance with examples of the embodiments.

Illustrative examples of the devices, systems, and methods disclosed herein are provided below. An embodiment of the devices, systems, and methods may include any one or more, and any combination of, the examples described below. This invention may, however, be embodied in many different forms and should not be construed as limited to the embodiments set forth below. Rather, these exemplary embodiments are provided so that this disclosure will be thorough and complete, and will fully convey the scope of the invention to those skilled in the art. Accordingly, the exemplary embodiments are intended to cover all alternatives, modifications, and equivalents as may be included within the spirit and scope of the apparatuses, mechanisms and methods as described herein.

We initially point out that description of well-known starting materials, processing techniques, components, equipment and other well-known details may merely be summarized or are omitted so as not to unnecessarily obscure the details of the present disclosure. Thus, where details are otherwise well known, we leave it to the application of the present disclosure to suggest or dictate choices relating to those details. The drawings depict various examples related to embodiments of illustrative methods, apparatus, and systems for printing onto a substrate web and automatically stacking individual sheets of the web for AM manufacturing.

When referring to any numerical range of values herein, such ranges are understood to include each and every number and/or fraction between the stated range minimum and maximum. For example, a range of 0.5-6% would expressly include the endpoints 0.5% and 6%, plus all intermediate values of 0.6%, 0.7%, and 0.9%, all the way up to and including 5.95%, 5.97%, and 5.99%. The same applies to each other numerical property and/or elemental range set forth herein, unless the context clearly dictates otherwise.

The modifier "about" used in connection with a quantity is inclusive of the stated value and has the meaning dictated by the context (for example, it includes at least the degree of error associated with the measurement of the particular quantity). When used with a specific value, it should also be considered as disclosing that value. For example, the term "about 2" also discloses the value "2" and the range "from about 2 to about 4" also discloses the range "from 2 to 4."

The term "controller" is used herein generally to describe various apparatus relating to the operation of one or more device that directs or regulates a process or machine, including a spatial light modulator (SLM). A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

FIG. 1 illustrates a block diagram of an apparatus 10 for imaging objects underwater in accordance with various exemplary embodiments of the present invention. Generally speaking, an underwater target 40 is illuminated and a detector 24 captures an image of target 40. In a turbid/turbulence medium, however, an illumination pattern will be degraded when propagating from the illuminator to the target. In such a turbid/turbulence medium, a consideration in an active electro-optical imaging system is to mitigate the contrast loss from common volumes scattering (which is similar to the effect of turning on high-beams in fog). Such contrast loss cannot be reduced by averaging multiple frames.

While a detector may be able to capture a relatively large number of photons reflecting off of a target, there may be insufficient photons to capture certain desirable portions of the image. Accordingly, optical engine 12 may be included. Optical engine 12 may include, for example, a Spatial Light Modulator (SLM) engine 50. Exemplary optical engines may include DLP LightCrafter E4500MKII (available from EKB Technologies). Merely as an example, CEL5500 manufactured by Digital Light Innovations may also be used, but is not preferred due to its larger size.

Optical engine 12 includes a SLM engine 50 and light source 16. The SLM engine 50 may include a SLM 14 (e.g., Digital Mirror Device (DMD), liquid crystal SLM, electrically addressed SLM, optically addressed SLM), and a controller 60.

Light source 16 may be a laser source, such as a continuous wave (CW) laser. In one exemplary embodiment of the present invention, light source 16 is a laser diode 18 based source, which may include a variety of light emitters. One example of an integrated laser diode driver and thermoelectric coolers (TEC) module is model LT-LD-TEC-4500 manufactured by Lasertack. Various wavelength laser diodes may be used based upon the application of the present invention. For example, blue laser diode illumination (approximately 360 nm-480 nm, 446 nm for example) may be used in a seabed imaging system due to its higher optical power output. Green laser (approximately 510 nm-570 nm, 532 nm for example) may be more preferable than blue laser in shallow coastal water. An LED 20 and a switch 22 are shown in the drawing as an alternative source of light for illuminating target 40, but the use of an LED (with or without a switch) may be optional.

Computer (PC) 30 is also included. Computer 30 has several functions, including power control of light source 16, and providing modulation pattern data to SLM 14. The SLM 14 modulates light received from light source 16 based on a modulation pattern data that is provided to SLM engine 50 via computer 30. SLM controller 60 receives the modulation pattern data from computer 30 and modifies the SLM 14 to modulate light received from light source 16 in accordance with the received modulation pattern data from the PC 30. Light thus transmitted towards target 40 has a modulation pattern in accordance with the received data.

The apparatus 10 for imaging objects underwater may include detector 24, which captures an image of target 40 that is illuminated by optical engine 12. In one exemplary embodiment, detector 24 captures photons reflected off of target 40. In one exemplary embodiment, detector 24 is a camera with high sensitivity and with low noise sensors. Exemplary cameras include Thorlabs DCC3260M, Thorlabs DCC3626DM, and Thorlabs Quantalux. Other cameras that embody CMOS or SCMOS technologies may be used as well. The detector 24 may also be a high dynamic range detector, for example having a high dynamic range of 16 bits or higher.

Data corresponding to the images captured by detector 24 may then be transmitted to computer 30 for further processing. Computer 30 may perform several steps in order to improve the quality of the image captured by detector 24.

Figure 2:
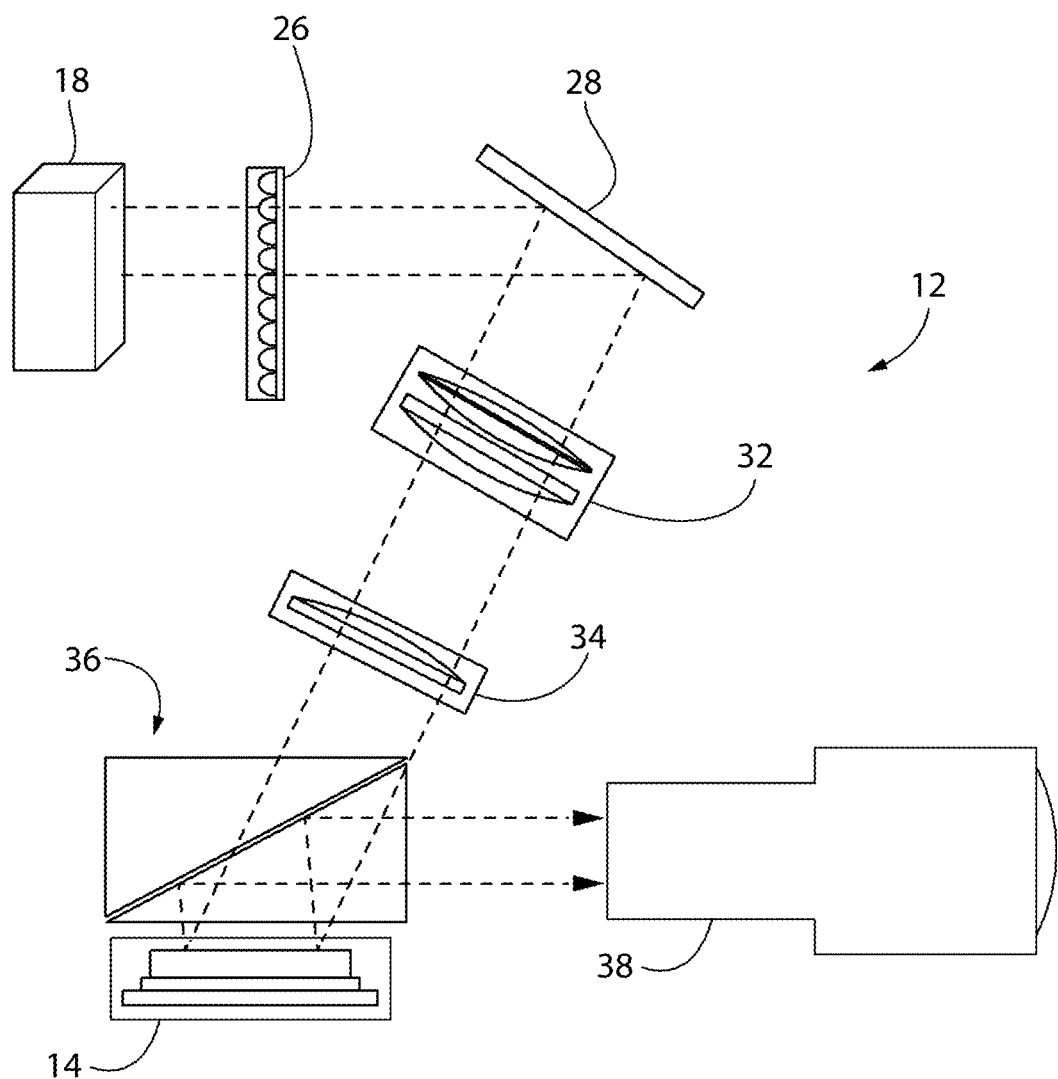
FIG. 2 is a side view of an optical engine in accordance with examples of the embodiments.

FIG. 2 is a block diagram that illustrates further details of the exemplary optical engine 12 shown in FIG. 1. The optical engine 12 is shown by example including laser diode 18 that emits light to SLM 14, which modulates the received light according to modulation pattern data received from the PC 30. The light may be beam shaped or otherwise modified between the laser diode 18 and the SLM 14. For example, light emitted from the laser diode 18 may be homogenized and shaped by microlens array 26 and reflected off mirror 28. Mirror 28 may be a folding mirror. The reflected light may be shaped by relay lenses 32 and 34, and directed through a prism, such as a Total Internal Reflection (TIR) prism 36. The TIR prism allows the light through to the SLM 14, and reflects the SLM modulated light to projection lens 38 for projection of the structured light onto the target 40 in coded illumination modulation patterns.

Figure 3:
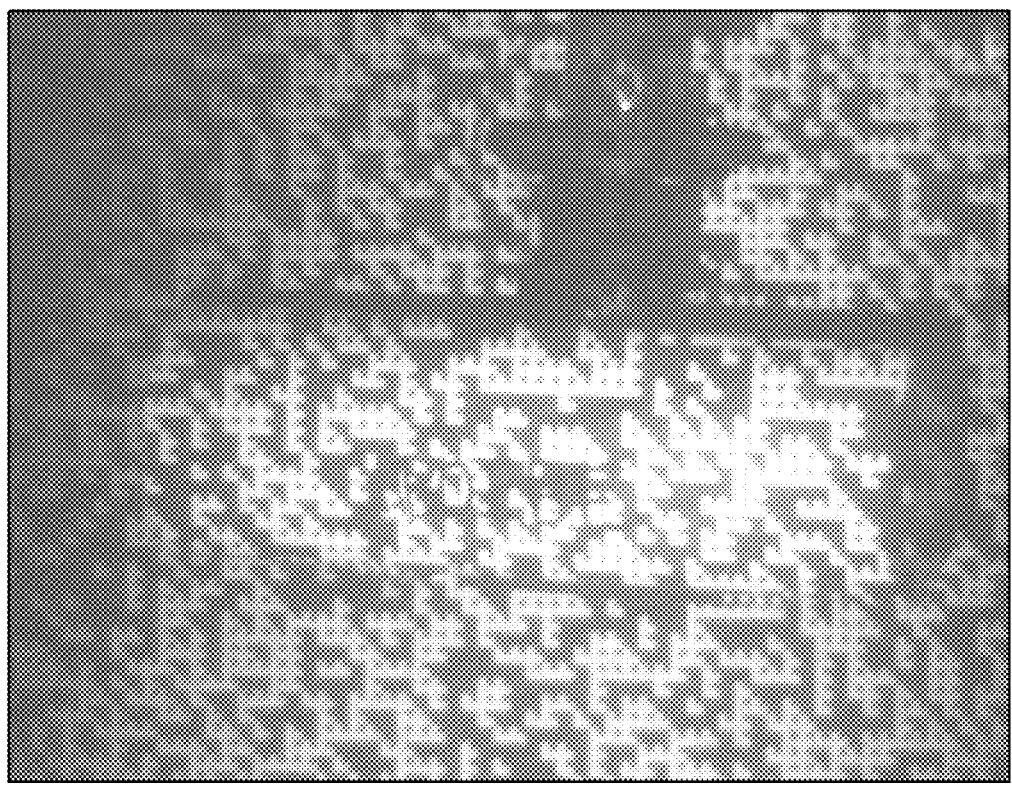
FIG. 3 illustrates an exemplary modulation pattern of light that is illuminating a target.

FIG. 3 illustrates an exemplary modulation pattern of light that is illuminating target 40. The modulation pattern of light (or "codebook") and optionally subsequent patterns can be determined in advance of actual illumination of the target. The modulation pattern(s) can also be random (e.g. a Bernoulli random pattern). Using these patterns provides the ability to record the response of each sub regions in the field of view under different illumination conditions (i.e., directly illuminated or not-directly illuminated). In one illumination condition, a particular subregion may be illuminated, while in another illumination condition, that particular subregion may not be illuminated. By analysis of the differences in responses resulting from the use of different modulation patterns, the computer 30 is intentionally configured to derive and reduce the interferences from the backscatter.

In one exemplary embodiment, computer 30 removes noise included in the image captured by detector 200. Noise may be removed by capturing multiple images of target 40 under different illumination patterns (such as patterns following Bernoulli random variable distributions, among others). In examples, each of the multiple images may be captured under a different illumination pattern. In an exemplary embodiment of the present invention, lower resolution patterns ("blocky" patterns) may be used—this can potentially simplify the illumination light engine design. In one exemplary embodiment, 36 patterns are captured with a camera frame rate of 15 frames/second.

Figure 4:
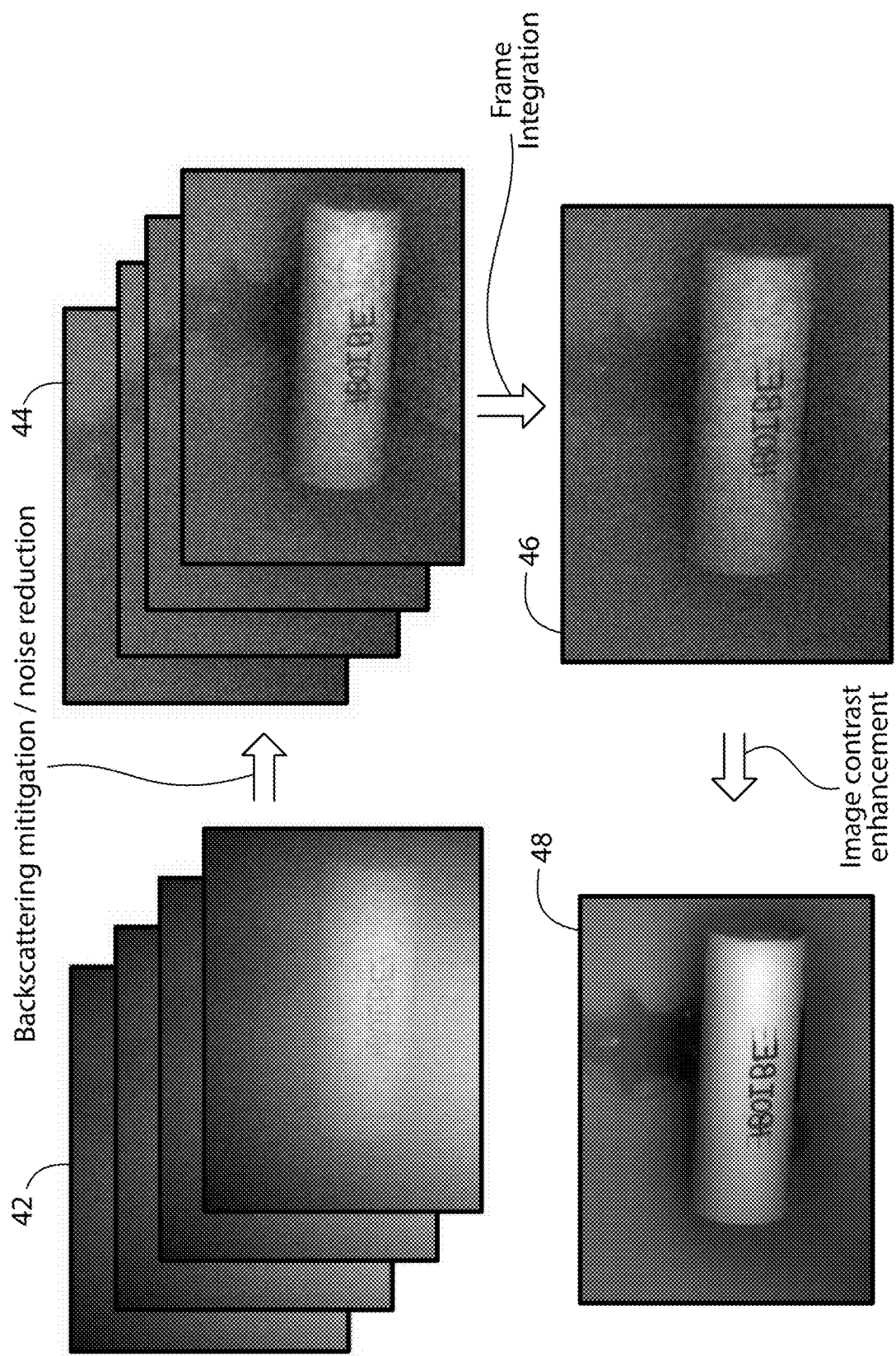
FIG. 4 illustrates an exemplary post processing of exemplary captured images.

FIG. 4 is an illustration of exemplary post processing that may then be used to mitigate contrast loss due to volume scattering and to recover target information. A group of coded images 42 captured by detector 24 may be transmitted to computer 30 for post processing. Exemplary post processing may then be performed in two separate stages. In a first stage (as shown in FIG. 4) the computer 30 applies non-local mean filtering of the group of coded images 42 to mitigate the backscatter, reduce the undesired noise and improve pattern contrast. In this stage, backscattering component is evaluated jointly using all the coded images and reduced from each individual image to provide filtered coded images 44. The essence of non-local filter techniques includes matching and grouping similar blocks in the images for collaborative filtering in a transform domain that the signal is sparse (i.e., the majority of coefficients in the transform domain are zeros), as understood by a skilled artisan.

In a second stage (as shown in FIG. 4), the sequence of filtered coded images 44 are integrated and image enhancement filtering is performed. In this stage, the computer 30 performs frame integration on the sequence of the coded images 44 to result in integrated frame 46. This is followed by image (contrast) enhancement filtering of the integrated frame 46 using a total variation noise reduction filter to result in the enhanced image 48.

Figure 5:
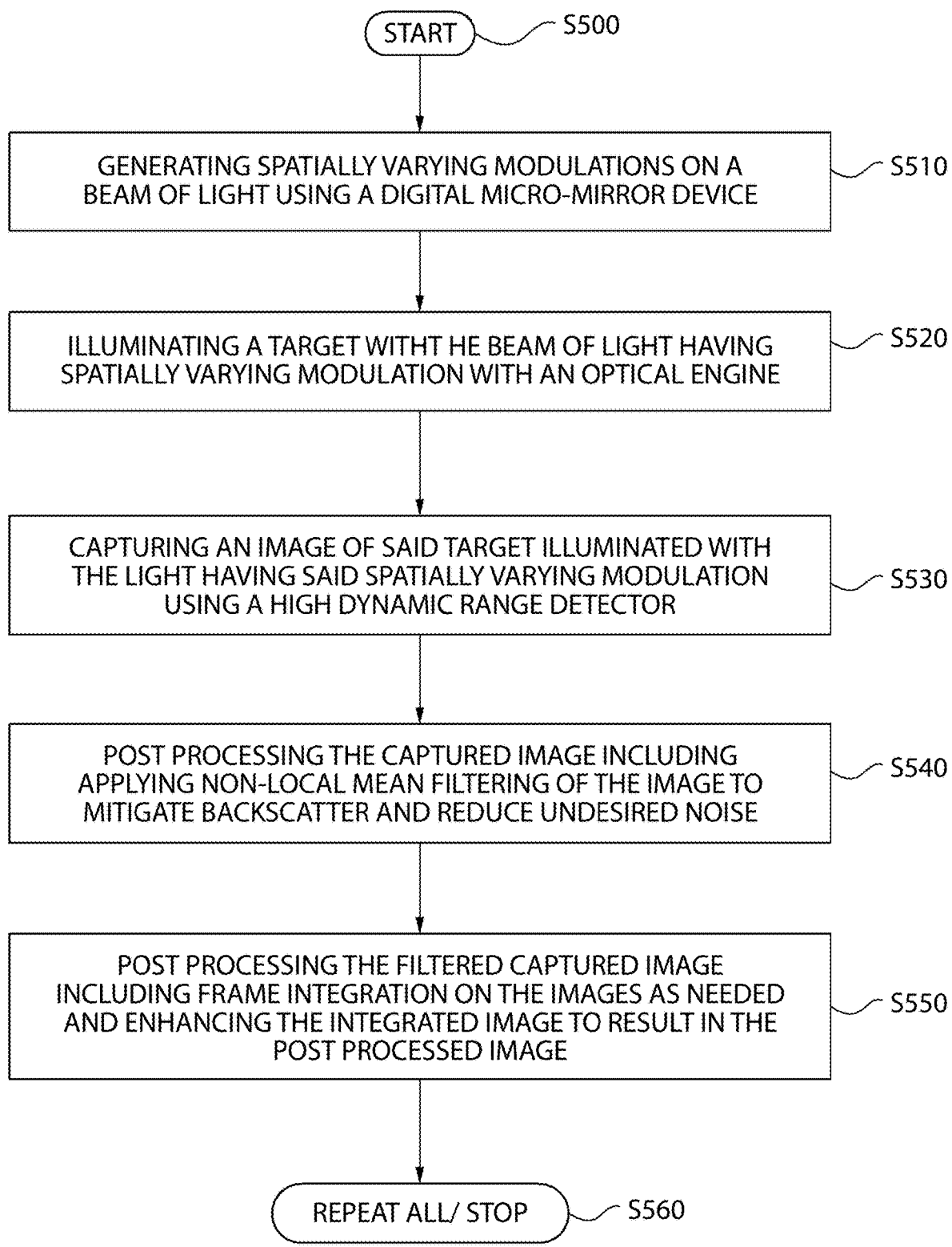
FIG. 5 is a flowchart depicting the operation of an exemplary method for imaging underwater objects.

The disclosed embodiments may include an exemplary imaging method for improved imaging of objects underwater. FIG. 5 illustrates a flowchart of such an exemplary method in a degraded underwater visual environment, which commences at Step S500 and proceeds to Step S510.

At Step S510, the apparatus 10 generates spatially varying modulation on a beam of light using a digital micro-mirror device 14. The spatially varying modulation may generate a sequence of coded illumination patterns. Operation of the method proceeds to Step S520, where an optical engine illuminates a target with the beam of light having spatially varying modulation. Operation of the method proceeds to Step S530. At Step S530, dynamic range detector 24 captures an image of the target illuminated with the light having the spatially varying modulation.

Operation of the method proceeds to Step S540 for post processing. At Step S540, the captured image is processed in a first stage, including applying non-local mean filtering of the image to mitigate backscatter and reduce undesired noise. Operation proceeds to Step S550 for a second stage of post processing where the apparatus 10, via the computer 30, performs frame integration on filtered captured images as needed and enhances the integrated image to result in the post processed image. Operation may repeat back to Step S510 for additional imaging as desired, or stop at Step S560.

The exemplary depicted sequence of executable method steps represents one example of a corresponding sequence of acts for implementing the functions described in the steps. The exemplary depicted steps may be executed in any reasonable order to carry into effect the objectives of the disclosed embodiments. No particular order to the disclosed steps of the method is necessarily implied by the depiction in FIG. 5, and the accompanying description, except where any particular method step is reasonably considered to be a necessary precondition to execution of any other method step. Individual method steps may be carried out in sequence or in parallel in simultaneous or near simultaneous timing. Additionally, not all of the depicted and described method steps need to be included in any particular scheme according to disclosure.

Figure 6A:
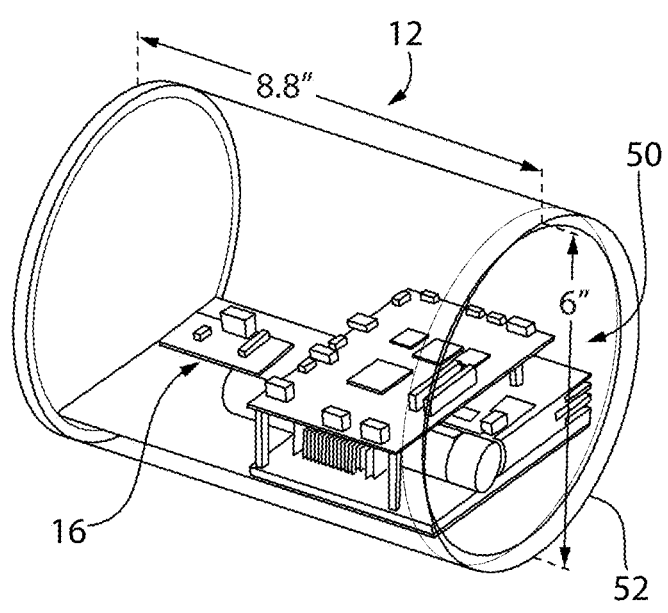
FIG. 6A is a front view of an optical engine having exemplary dimensions according to examples.
Figure 6B:
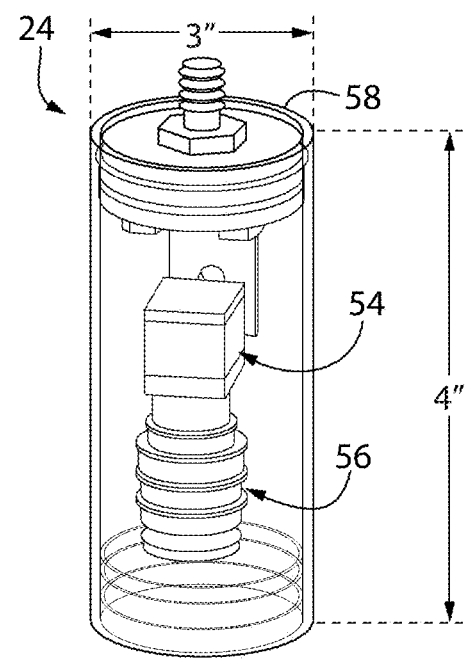
FIG. 6B a front view of a detector (e.g., camera) having exemplary dimensions according to examples.

FIG. 6A and FIG. 6B depict an exemplary optical engine 12 and an exemplary detector 24, respectively, along with exemplary dimensions. The various components may be housed within watertight cases. In particular, FIG. 6A shows light source 16 and SLM engine 50 housed within a watertight case 52. FIG. 6B shows a camera 54 and lens 56 housed within a watertight case 58. The cases may be compact, with the detector 24 about the size of a typical twelve fluid ounce beverage can.

FIG. 7 is a table showing cumulative AZ dust, C and beam attenuation lengths for images taken of underwater target 40 at a distance of 4.3 meters, where the beam attenuation lengths represent the degradation of the water. FIGS. 8-11 show images of underwater target 40 taken with the target in increasing levels of water degradation, where images would typically show increasing amounts of backscatter and decreased quality with increasing levels of degraded water. As can be seen in FIGS. 9-11, image processing under examples of the embodiments improves the quality of the image in degraded water, with differences more significant with increased degradation.

FIG. 8 depicts images taken of the underwater target 40 in clear water and a beam attenuation length of 0.301. In particular, FIG. 8A is an image of underwater target 40 taken with a Thorlabs DCC3626 camera and floor illumination. FIG. 8B is an image of underwater target 40 taken with a Nikon camera and flood illumination.

Figure 9A:
FIG. 9A is an image of underwater target taken with a Thorlabs DCC3626 camera and floor illumination.
Figure 9B:
FIG. 9B is an image of underwater target taken with a Nikon camera and flood illumination.
Figure 9C:
FIG. 9C is a post processed image of underwater target taken with a Thorlabs DCC3626 camera with coded illumination and post processing via an example of the embodiments.

FIG. 9 depicts images taken of the underwater target 40 in degraded water having a beam attenuation length of 2.855. In particular, FIG. 9A is an image of underwater target 40 taken with a Thorlabs DCC3626 camera and floor illumination. FIG. 9B is an image of underwater target 40 taken with a Nikon camera and flood illumination. FIG. 9C is a post processed image of underwater target 40 taken with a Thorlabs DCC3626 camera with coded illumination and post processing via an example of the embodiments. The underwater target can be seen most clearly in FIG. 9C.

Figure 10A:
FIG. 10A is an image of underwater target taken with a Thorlabs DCC3626 camera and floor illumination.
Figure 10B:
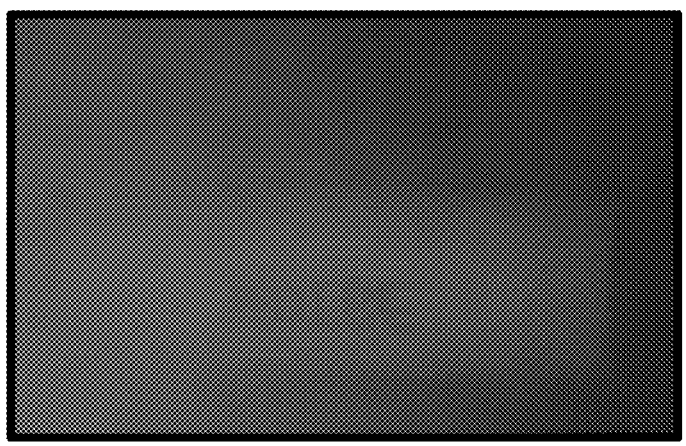
FIG. 10B is an image of underwater target taken with a Nikon camera and flood illumination.
Figure 10C:
FIG. 10C is a post processed image of underwater target taken with a Thorlabs DCC3626 camera with coded illumination and post processing via an example of the embodiments.

FIG. 10 depicts images taken of the underwater target 40 in degraded water having a beam attenuation length of 4.029. In particular, FIG. 10A is an image of underwater target 40 taken with a Thorlabs DCC3626 camera and floor illumination. FIG. 10B is an image of underwater target 40 taken with a Nikon camera and flood illumination. FIG. 10C is a post processed image of underwater target 40 taken with a Thorlabs DCC3626 camera with coded illumination and post processing via an example of the embodiments. The underwater target can be seen most clearly in FIG. 10C.

Figure 11A:
FIG. 11A is an image of underwater target taken with a Thorlabs DCC3626 camera and floor illumination.
Figure 11B:
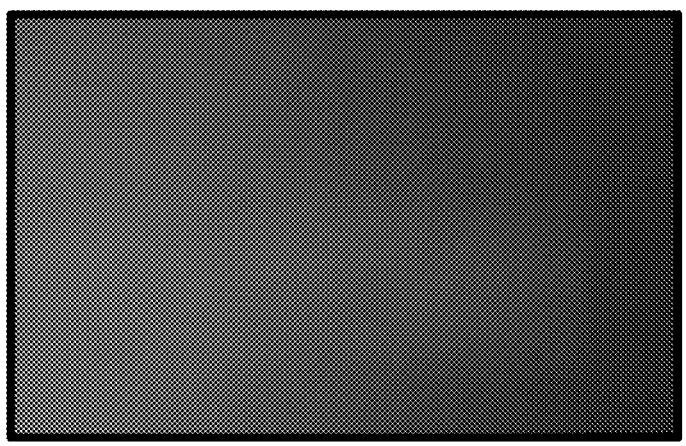
FIG. 11B is an image of underwater target taken with a Nikon camera and floodlight illumination.
Figure 11C:
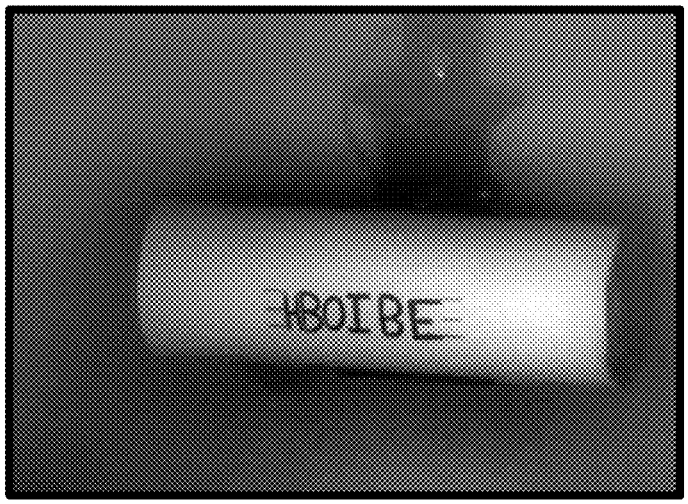
FIG. 11C is a post processed image of underwater target taken with a Thorlabs DCC3626 camera with coded illumination and post processing via an example of the embodiments.

FIG. 11 depicts images taken of the underwater target 40 in degraded water having a beam attenuation length of 2.855. In particular, FIG. 11A is an image of underwater target 40 taken with a Thorlabs DCC3626 camera and floor illumination. FIG. 11B is an image of underwater target 40 taken with a Nikon camera and floodlight illumination. FIG. 11C is a post processed image of underwater target 40 taken with a Thorlabs DCC3626 camera with coded illumination and post processing via an example of the embodiments. The underwater target can be seen most clearly in FIG. 11C.

In an exemplary embodiment of the present invention a computer system may be included and/or operated within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a personal digital assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system includes a processing device, a main memory (e.g., read-only memory (ROM), flash memory, dynamic random access memory (DRAM) (such as synchronous DRAM (SDRAM) or Rambus DRAM (RDRAM), etc.), a static memory (e.g., flash memory, static random access memory (SRAM), etc.), and a data storage device, which communicate with each other via a bus.

Processing device represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device may also be one or more special-purpose processing devices such as an application specific integrated circuit (ASIC), a field programmable gate array (FPGA), a digital signal processor (DSP), network processor, or the like. Processing device is configured to execute listings manager logic for performing the operations and steps discussed herein.

Computer system may further include a network interface device. Computer system also may include a video display unit (e.g., a liquid crystal display (LCD) or a cathode ray tube (CRT)), an alphanumeric input device (e.g., a keyboard), a cursor control device (e.g., a mouse), and a signal generation device (e.g., a speaker).

Data storage device may include a machine-readable storage medium (or more specifically a computer-readable storage medium) having one or more sets of instructions (e.g., reference generation module) embodying any one or more of the methodologies of functions described herein. The reference generation module may also reside, completely or at least partially, within main memory and/or within processing device during execution thereof by computer system; main memory and processing device also constituting machine-readable storage media. The reference generation module may further be transmitted or received over a network via network interface device.

Machine-readable storage medium may also be used to store the device queue manager logic persistently. While a non-transitory machine-readable storage medium is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instruction for execution by the machine and that causes the machine to perform any one or more of the methodologies of the present invention. The term "machine-readable storage medium" shall accordingly be taken to include, but not be limited to, solid-state memories, and optical and magnetic media.

The components and other features described herein can be implemented as discrete hardware components or integrated in the functionality of hardware components such as ASICs, FPGAs, DSPs or similar devices. In addition, these components can be implemented as firmware or functional circuitry within hardware devices. Further, these components can be implemented in any combination of hardware devices and software components.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

The instructions may include, for example, computer-executable instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, and the like that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described therein.

In the aforementioned description, numerous details are set forth. It will be apparent, however, to one skilled in the art, that the disclosure may be practiced without these specific details. In some instances, well-known structures and devices are shown in block diagram form, rather than in detail, in order to avoid obscuring the disclosure.

The disclosure is related to an apparatus for performing the operations herein. This apparatus may be specially constructed for the required purposes or it may comprise a general purpose computing device selectively activated or reconfigured by a computer program stored therein. Such a computer program may be stored in a non-transitory computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory devices including universal serial bus (USB) storage devices (e.g., USB key devices) or any type of media suitable for storing electronic instructions, each of which may be coupled to a computer system bus.

Whereas many alterations and modifications of the disclosure will no doubt become apparent to a person of ordinary skill in the art after having read the foregoing description, it is to be understood that any particular implementation shown and described by way of illustration is in no way intended to be considered limiting. Therefore, references to details of various implementations are not intended to limit the scope of the claims, which in themselves recite only those features regarded as the disclosure.

What is claimed is:

1. A method for imaging underwater objects in a degraded underwater visual environment having turbid or turbulent medium for close range target inspection, diver assist, and/or robotic operations, said method comprising:
   a) generating, via a light source comprising an optical engine configured with a spatial light modulator, spatially varying modulation on a beam of light using the spatial light modulator to generate a plurality of coded modulation patterns having different lighting conditions corresponding to the plurality of coded modulation patterns to project onto and illuminate a target in the degraded underwater visual environment at, at least, a CMOS or SCMOS camera associated frame rate, wherein the sequence of coded illumination patterns follow a Bernoulli random variable distribution, wherein each of the different lighting conditions corresponds to one of a sequence of coded illumination patterns associated with the plurality of coded modulation patterns, and wherein the plurality of coded modulation patterns each has a repeating pre-defined geometric configuration;
   b) illuminating, via the light source, the target with the beam of light having the spatially varying modulation using the sequence of coded illumination patterns;
   c) capturing, via a detector comprising a CMOS or SCMOS camera, a plurality of images of said target illuminated with said beam of light having said spatially varying modulation through the sequence of coded illumination patterns, wherein the detector is configured to capture the plurality of images at the CMOS or SCMOS associated frame rate; and
   d) post processing, via the detector or via a remote computing device, the plurality of captured images by applying a non-local means filtering operator configured to jointly operate on all portions of each of the plurality of captured images while grouping similar block elements having the repeating pre-defined geometric configuration to mitigate backscatter from the degraded underwater visual environment, wherein the post processing further includes, after applying the non-local means filter operator: i) performing frame integration on the plurality of captured images to generate an integrated frame, and ii) enhancing the integrated frame by applying a total variation noise reduction filter to the integrated frame to mitigate backscatter, reduce noise, and/or improve pattern contrast.

2. The method of claim 1, wherein said beam of light is generated using a continuous wave laser.

3. The method of claim 1, wherein each of the plurality of captured images includes the target and backscattering and has data of different patterns of the backscattering in comparison to the target, wherein the step d) includes removing the backscattering based on differences in backscatter between the data of the different patterns of the backscattering in comparison to the target.

4. The method of claim 1, wherein at least two of the plurality of images corresponding to different ones of the coded illumination patterns and including the target and backscattering, the captured plurality of images having data of different patterns of the backscattering in comparison to the target.

5. The method of claim 1, further comprising receiving digital modulation pattern data with a controller and modifying the spatial light modulator to modulate the beam of light in accordance with the received digital modulation pattern data.

6. A non-transitory computer readable medium having instructions stored thereon that, when executed by a processor, cause an underwater imaging device to:
   capture a plurality of images at a CMOS or SCMOS associated frame rate of a target illuminated with a beam of light having a spatially varying modulation,
      wherein the target is a close range underwater object in a degraded underwater visual environment having turbid or turbulent medium,
      wherein the spatially varying modulation is generated via a light source comprising an optical engine configured with a spatial light modulator,
      wherein the spatially varying modulation includes a plurality of coded modulation patterns having different lighting conditions that corresponds to the coded modulation patterns, wherein the sequence of coded illumination patterns follow a Bernoulli random variable distribution, wherein the spatially varying modulation is projected and illuminated on a target in a degraded underwater visual environment at, at least, a CMOS or SCMOS associated frame rate, wherein the each of the different lighting conditions corresponds to one of a sequence of coded illumination patterns associated with the plurality of coded modulation patterns, and
      wherein the plurality of coded modulation patterns each has a repeating pre-defined geometric configuration; and
   post process the plurality of images by: i) applying a non-local means filtering operator configured to jointly operate on all portions of each of the plurality of images while grouping similar block elements having the repeating pre-defined geometric configuration to mitigate backscatter from the degraded underwater visual environment, ii) after applying the non-local means filter operator, performing frame integration on the plurality of captured images to generate an integrated frame, and ii) enhancing the integrated frame by applying a total variation noise reduction filter to the integrated frame to mitigate backscatter, reduce noise, and/or improve pattern contrast.

7. An apparatus for imaging underwater objects in a degraded underwater visual environment having turbid or turbulent medium for close range target inspection, diver assist, and/or robotic operations, the apparatus comprising:
   an analysis system comprising a computer device configured to evaluate images acquired via a CMOS or SCMOS camera, wherein the CMOS or SCMOS camera captures a plurality of images of an underwater target illuminated with a modulated beam of light having a sequence of coded illumination patterns, with each of the plurality of images corresponding to a respective one of a plurality of coded illumination patterns and including the target and backscattering, the captured plurality of images having data of different patterns of the backscattering in comparison to the target,
   wherein the plurality of coded modulation patterns each has a repeating pre-defined geometric configuration,
   wherein the sequence of coded illumination patterns follow a Bernoulli random variable distribution, and
   wherein evaluating the images comprises processing the plurality of images using a non-local means filtering operator configured to jointly operate on all portions of each of the plurality of captured images while grouping similar block elements having the repeating pre-defined geometric configuration to mitigate backscatter from the degraded underwater visual environment, wherein the post processing further includes, after applying the non-local means filter operator: i) performing frame integration on the plurality of captured images to generate an integrated frame, and ii) enhancing the integrated frame by applying a total variation noise reduction filter to the integrated frame to mitigate backscatter, reduce noise, and/or improve pattern contrast.

8. The apparatus of claim 7, further comprising a controller configured to receive digital modulation pattern data and modify the spatial light modulator to modulate the beam of light in accordance with the received digital modulation pattern data.

* * * * *